US010871898B2

(12) United States Patent
Lee et al.

(10) Patent No.: US 10,871,898 B2
(45) Date of Patent: Dec. 22, 2020

(54) DISPLAY APPARATUS FOR PROVIDING PREVIEW UI AND METHOD OF CONTROLLING DISPLAY APPARATUS

(71) Applicant: SAMSUNG ELECTRONICS CO., LTD., Suwon-si (KR)

(72) Inventors: Ji-yeon Lee, Seoul (KR); Eun-nim Cho, Suwon-si (KR); Sang-jin Han, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 16/118,035

(22) Filed: Aug. 30, 2018

(65) Prior Publication Data
US 2019/0065048 A1 Feb. 28, 2019

(30) Foreign Application Priority Data
Aug. 31, 2017 (KR) .................. 10-2017-0111374

(51) Int. Cl.
*G06F 3/0488* (2013.01)
*G06F 3/0482* (2013.01)
*G06F 3/0484* (2013.01)
*G06F 3/0483* (2013.01)

(52) U.S. Cl.
CPC ........ *G06F 3/04886* (2013.01); *G06F 3/0482* (2013.01); *G06F 3/0483* (2013.01); *G06F 3/04842* (2013.01); *G06F 3/04845* (2013.01); *G06F 3/04883* (2013.01); *G06F 2203/04806* (2013.01); *G06F 2203/04808* (2013.01)

(58) Field of Classification Search
CPC combination set(s) only.
See application file for complete search history.

(56) References Cited

U.S. PATENT DOCUMENTS

| 8,739,073 B2 | 5/2014 | Han et al. |
| 2010/0095239 A1 | 4/2010 | McCommons et al. |
| 2013/0069860 A1 | 3/2013 | Davidson |
| 2013/0117665 A1* | 5/2013 | Tagliaferri ............ G06F 40/166 715/255 |

(Continued)

FOREIGN PATENT DOCUMENTS

| JP | 2014-23132 A | 2/2014 |
| JP | 2014-230211 A | 12/2014 |

(Continued)

OTHER PUBLICATIONS

KR 10-2011-0020647 Mar. 3, 2011 Park Yong Gook (Year: 2011).*

(Continued)

*Primary Examiner* — Van N Chow
(74) *Attorney, Agent, or Firm* — Sughrue Mion, PLLC

(57) ABSTRACT

A display apparatus and a method of controlling the display apparatus are provided. The method includes displaying a first page of a plurality of pages, based on a first touch input being sensed while the first page is displayed, displaying a preview user interface (UI) including a plurality of preview pages respectively corresponding to the plurality of pages, and based on a second touch input being sensed on a preview page among the plurality of preview pages, revising a content included in the preview page on which the second touch input is sensed, according to the second touch input.

20 Claims, 12 Drawing Sheets

(56) References Cited

U.S. PATENT DOCUMENTS

| | | | |
|---|---|---|---|
| 2014/0115070 A1* | 4/2014 | Virtanen | G06Q 10/107 709/206 |
| 2015/0234796 A1* | 8/2015 | Williams | G06F 40/14 715/229 |
| 2016/0140417 A1 | 5/2016 | Kang et al. | |
| 2016/0255268 A1 | 9/2016 | Kang et al. | |
| 2017/0075530 A1 | 3/2017 | Genoni et al. | |
| 2017/0090692 A1* | 3/2017 | Kurita | G06F 3/04883 |
| 2017/0090704 A1* | 3/2017 | Hu | G06F 3/0484 |
| 2018/0253221 A1 | 9/2018 | Cho et al. | |

FOREIGN PATENT DOCUMENTS

| | | |
|---|---|---|
| JP | 5751281 B2 | 7/2015 |
| JP | 5807433 B2 | 11/2015 |
| KR | 10-2011-0020647 A | 3/2011 |
| KR | 10-2015-0100117 A | 9/2015 |
| KR | 10-2016-0059358 A | 5/2016 |
| KR | 10-2016-0066799 A | 6/2016 |
| KR | 10-2018-0101655 A | 9/2018 |

OTHER PUBLICATIONS

JP 2014-230211 Dec. 8, 2014 Suzuki Hiroyuki (Year: 2014).*
International Search Report (PCT/ISA/210) dated Feb. 1, 2019, issued by International Searching Authority in International Application No. PCT/KR2018/009708.
Written Opinion (PCT/ISA/237) dated Feb. 1, 2019, issued by the International Searching Authority in International Application No. PCT/KR2018/009708.
Communication dated Jun. 26, 2020 issued by the European Intellectual Property Office in European Application No. 18852411.0.

* cited by examiner (a)

(b)

(a)

(b)

(c)

(a)

(b)

(a)

(b)

(a)

(b)

DISPLAY APPARATUS FOR PROVIDING PREVIEW UI AND METHOD OF CONTROLLING DISPLAY APPARATUS

CROSS-REFERENCE TO RELATED APPLICATIONS

This application is based on and claims priority under 35 U.S.C. § 119 to Korean Patent Application No. 10-2017-0111374, filed on Aug. 31, 2017, in the Korean Intellectual Property Office, the disclosure of which is incorporated by reference herein in its entirety.

BACKGROUND

Field

The disclosure relates to a display apparatus and a method of controlling the display apparatus, and more particularly, to a display apparatus for providing a preview user interface (UI) including a plurality of preview pages corresponding to a plurality of pages and a method of controlling the display apparatus.

Description of Related Art

Display apparatuses may have various sizes. For example, display apparatuses including large screen displays (e.g., 75-inch or more displays) have been provided. Such large screen display apparatuses have been used in various environments such as public conference rooms, classrooms, and the like.

In general, a large screen display apparatus may display one of a plurality of pages or may move and display a plurality of pages according to a user input.

However, a user may want to navigate or modify contents included in another page while displaying a particular page. Here, according to related art technology, the user may navigate or modify contents of another page by directly moving to the another page and then checking or modifying contents.

SUMMARY

Provided are a display apparatus for enabling a user to more conveniently and intuitively check or modify a plurality of pages by providing a preview user interface (UI) including a plurality of preview pages corresponding to the plurality of pages on a display, and a method of controlling the display apparatus.

Additional aspects will be set forth in part in the description which follows and, in part, will be apparent from the description, or may be learned by practice of the presented embodiments.

In accordance with an aspect of the disclosure, a method of controlling a display apparatus includes displaying a first page of a plurality of pages; based on a first touch input being sensed while the first page is displayed, displaying a preview user interface comprising a plurality of preview pages respectively corresponding to the plurality of pages; and based on a second touch input being sensed on a preview page among the plurality of preview pages, revising a content in the preview page on which the second touch input is sensed, according to the second touch input.

The revising may include, based on the second touch input being sensed on a first preview page corresponding to the first page, simultaneously revising a content in the first preview page and a content in the first page according to the second touch input.

The revising may include: based on the second touch input being sensed on a second preview page corresponding to a second page among the plurality of pages, revising a content in the second preview page according to the second touch input, wherein the second page may not be displayed when the second touch input is sensed on the second preview page; and storing the second page including the revised content of the second preview page.

The method may include, based on a third touch input for changing to the second page being sensed, displaying the second page including the revised content of the second preview page.

The method may include, based on the second touch input being a pinch-out touch being sensed on a first preview page among the plurality of preview pages, zooming in the first page; and based on the second touch input being a pinch-in touch being sensed on the first preview page, zooming out the first page.

The displaying of the preview user interface may include displaying an editing tool user interface near the preview user interface, wherein the revising may include, based on the second touch input being sensed on the preview page among the plurality of preview pages after an icon in the editing tool user interface is selected, revising a content in the preview page on which the second touch input is sensed, according to an editing function corresponding to the selected icon.

The method may include, based on a third touch input being sensed for revising a content displayed on the first page, revising the content displayed on the first page and simultaneously revising a content displayed on a first preview page corresponding to the first page.

The method may include, based on a third touch input being sensed for touching and dragging a point of the preview UI for a preset time, dragging the preview user interface according to a direction of the dragging.

The displaying of the preview user interface may include, based on the first touch input being sensed for selecting an icon for generating the preview user interface from an editing tool UI displayed on the first page, displaying the preview user interface.

The revising may include, based on the second touch input being sensed on the preview page among the plurality of preview pages simultaneously with a third touch input being sensed on the first page, revising a content of the first page and a content of a first preview page corresponding to the first page according to the third touch input, while revising a content in the preview page on which the second touch input is sensed, according to the second touch input.

In accordance with an aspect of the disclosure, a display apparatus includes: a display; a touch input interface configured to sense a touch input; and a processor configured to: control the display to display a first page of a plurality of pages based on a first touch input being sensed through the touch input interface while the first page is displayed; control the display to display a preview user interface including a plurality of preview pages respectively corresponding to the plurality of pages; and based on a second touch input being sensed on a preview page among the plurality of preview pages through the touch input interface, control the display to revise a content in the preview page on which the second touch input is sensed, according to the second touch input.

The processor may be further configured to, based on the second touch input being sensed on a first preview page corresponding to the first page, control the display to simultaneously revise a content in the first preview page and a content in the first page according to the second touch input.

The display apparatus may further include a memory and the processor may be further configured to: based on the second touch input being sensed on a second preview page corresponding to a second page among the plurality of pages, control the display to revise a content in the second preview page according to the second touch input, wherein the second page may not be displayed when the second touch input is sensed on the second preview page; and store a second page including the revised content of the second preview page in the memory.

The processor may be further configured to, based on a third touch input being sensed for changing to the second page, control the display to display the second page including the revised content of the second preview page.

The processor may be further configured to control the display to zoom in the first page based on a pinch-out touch being sensed on a first preview page, among the plurality of preview pages, and zoom out the first page based on a pinch-in touch being sensed on the first preview page.

An editing tool user interface may be displayed near the preview user interface, and wherein the processor may be further configured to, based on the second touch input being sensed on a preview page among the plurality of preview pages after an icon in the editing tool user interface is selected, control the display to revise a content in the preview page on which the second touch input is sensed, according to an editing function corresponding to the selected icon.

The processor may be further configured to, based on a third touch input being sensed for revising a content displayed on the first page, control the display to simultaneously revise a content displayed on the first page and a content displayed on a first preview page corresponding to the first page.

The processor may be further configured to, based on a third touch input being sensed for touching and dragging a point of the preview user interface for a preset time, control the display to drag the preview user interface according to a direction of the dragging.

The processor may be further configured to, based on a third touch input being sensed for selecting an icon for generating the preview user interface from an editing tool user interface displayed on the first page, control the display to display the preview user interface.

The processor may be further configured to, based on the second touch input being sensed on a preview page among the plurality of preview pages simultaneously with a third touch input being sensed on the first page, control the display to revise a content of the first page and a content of a first preview page corresponding to the first page according to the third touch input, while revising a content in the preview page on which the touch input is sensed, according to the second touch input.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
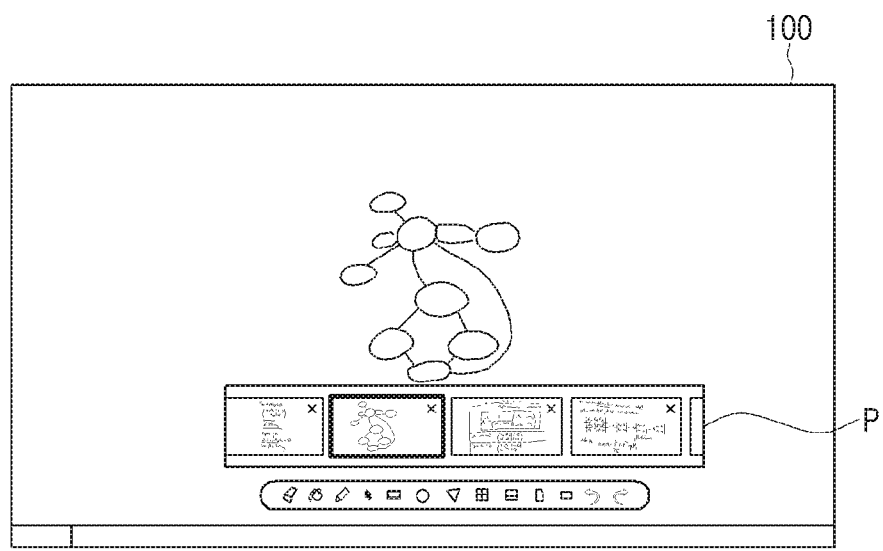
FIG. 1 is a view illustrating a preview user interface (UI) according to an embodiment.

Embodiments of the disclosure will now be described in greater detail with reference to the accompanying drawings.

The disclosure provides a display apparatus for enabling a user to more conveniently and intuitively check or modify a plurality of pages by providing a preview user interface (UI) including a plurality of preview pages corresponding to the plurality of pages on a display, and a method of controlling the display apparatus.

According to various embodiments, a user may more conveniently and intuitively navigate a page which is not currently displayed or modify contents of the page through a preview user interface (UI). Therefore, a large screen display may be increasingly conveniently used in a display apparatus.

In the following description, same drawing reference numerals are used for the same elements even in different drawings. The matters defined in the description, such as detailed construction and elements, are provided to assist in a comprehensive understanding of the disclosure. Thus, it is apparent that the embodiments of the disclosure may be carried out without those specifically defined matters. Also, well-known functions or constructions are not described in detail since they would obscure the disclosure with unnecessary detail.

The terms used herein will be described in brief, and the disclosure will be described in detail The terms used in embodiments of the disclosure are selected as general terms that are currently widely used in consideration of their functions in the disclosure. However, this may depend on intentions of those skilled in the art, precedents, emergences of new technologies, or the like. Also, an applicant may arbitrarily select terms in a particular case, and detailed meanings of the terms will be described in description parts of embodiments corresponding to the particular case. Therefore, the terms used herein may be defined based on meanings of the terms and whole contents of the embodiments not on simple names of the terms.

Embodiments of the disclosure may be made into various modifications and may have several types of embodiments. Therefore, particular embodiments will be illustrated in the drawings and will be described in detail in the detailed description of the disclosure. However, this is not intended to limit the scope of a particular embodiment and may be understood as including all changes, equivalents, and alternatives which belong to the spirit and scope of the disclosure. Detailed descriptions of embodiments will be omitted if detailed descriptions of related well-known technologies are determined as making the main point of the disclosure obscure.

Although the terms 'first', 'second', etc. may be used herein to describe various elements regardless of orders and/or importances, these elements may not be limited by these terms. These terms are merely used to distinguish one element from another.

The singular expression also includes the plural meaning as long as it does not differently mean in the context. In the application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the embodiments, a "module" or a "part" performs at least one function or operation, and may be implemented with hardware, software, or a combination thereof. In addition, a plurality of "modules" or a plurality of "parts" may be integrated into at least one module, except for a "module" or a "part" which has to be implemented as at least one processor by being implemented as particular hardware.

Also, when any part is "connected to" another part, this includes a "direct connection" and an "electrical connection" through another medium. In addition, it may mean that the any part may be physically and wirelessly connected to the another part. Unless otherwise defined, when any part "includes" any element, it may mean that any part further includes other elements without excluding other elements.

Hereinafter, embodiments of the disclosure will be described in detail with reference to the attached drawings and thus may be easily implemented by those skilled in the art to which the disclosure pertains. However, the disclosure may be embodied into several different forms and is not limited to embodiments that will be described herein. Also, the disclosure will be clearly described by omitting parts, which are not associated with descriptions, from the drawings, and similar reference numerals will be attached to similar parts throughout the specification.

Hereinafter, the disclosure will be described in detail with reference to the attached drawings. FIG. 1 is a view illustrating a preview user interface (UI) provided by a display apparatus 100 according to an embodiment. Here, the display apparatus 100 may be realized as an electronic blackboard having a large screen display (e.g., a 75-inch or more display) used in a lecture room, a conference room, or the like, but this is merely an embodiment. The display apparatus 100 may be realized as various types of display apparatuses 100 such as a TV, a desktop personal computer (PC), a notebook PC, an electronic billboard, and the like having a display.

In particular, the display apparatus 100 may display a first page of a plurality of pages. Here, the plurality of pages may respectively include various types of contents such as a writing content, an image content, a moving picture content, and the like. For example, as shown in FIG. 1, the writing content may be included in the first page.

If a preset touch input is sensed while displaying the first page, the display apparatus 100 may display a preview UI P including a plurality of preview pages respectively corresponding to the plurality of pages. Here, merely a few of the plurality of preview pages included in the preview UI P may be displayed, and the preview UI P may be scrolled according to a touch input.

In particular, a preview page included in the preview UI P may be a screen having a preset size (e.g., 7 inches) and may include a content of a corresponding page. In other words, a user may navigate a content of a page, which is not currently displayed, through a preview page.

Also, if a user touch is sensed through the preview page, the display apparatus 100 may revise a content included in the preview page according to the user touch. For example, if a user touch for writing is sensed through a first preview page, the display apparatus 100 may input a writing content corresponding to the user touch into the first preview page. In this case, the display apparatus 100 may insert and store the writing content corresponding to the user touch into a page corresponding to the first preview page.

Therefore, through a preview UI, the user may navigate pages which are not currently displayed and may revise contents included in the pages which are not currently displayed.

Also, the display apparatus 100 may perform various types of operations through the preview UI. This will be described in detail later with reference to the drawings.

Figure 2:
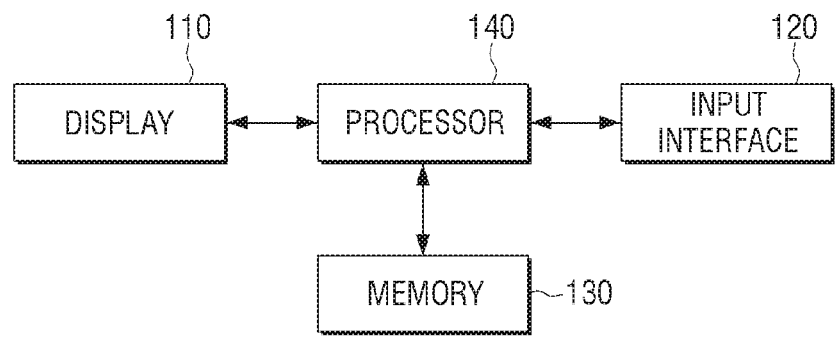
FIG. 2 is a block diagram of a simple configuration of a display apparatus according to an embodiment.

FIG. 2 is a block diagram of a simple configuration of a display apparatus according to an embodiment. As shown in FIG. 2, the display apparatus 100 includes a display 110, an input interface 120, a memory 130, and a processor 140.

The display 110 may display at least one of a plurality of pages. In detail, the display 110 may display one of the plurality of pages and, if a page is moving in response to a user command for displaying another page, may display the plurality of pages. Here, the plurality of pages may be stored in one file and may respectively include various types of contents such as a writing content, a moving picture content, an image content, and the like.

The display 110 according to an embodiment may have a size larger than or equal to a preset size (e.g., 75 inches).

The input interface 120 may sense a user input for controlling the display apparatus 100. In particular, the input interface 120 may sense a touch input on the display 110. Here, the input interface 120 may be realized as a touch input interface (e.g., a touch panel) or as a touch screen by being combined with the display 110.

In particular, the input interface 120 may sense a touch input for generating a preview UI and a touch input for revising a content included in one of a plurality of preview pages included in the preview UI.

The memory 130 may store a program for performing an operation of the display apparatus 100. The memory 130 may also store data on the plurality of pages.

The processor 140 may be connected to the display 110, the input interface 120, and the memory 130 and may control an overall operation of the display apparatus 100 by using the program stored in the memory 130. In particular, the processor 140 may control the display 110 to display a first page of the plurality of pages. If a preset touch input is sensed through the input interface 120 while the first page is displayed, the processor 140 may control the display 110 to display the preview UI including the plurality of preview pages respectively corresponding to the plurality of pages.

Also, if a touch input is sensed on one of the plurality of preview pages, the processor 140 may control the display 110 to revise a content included in the preview page, on which the touch input is sensed, according to the touch input.

In detail, the processor 140 may control the display 110 to display the first page of the plurality of pages. Here, an editing tool UI for inserting a content into a page or revising the content may be displayed on the first page.

Also, if an icon for generating the preview UI is selected from the editing tool UI, the processor 140 may control the display 110 to display the preview UI including the plurality of preview pages corresponding to the plurality of pages. Here, the processor 140 may control the display 110 to display the preview UI together with the first page. The preview UI may be displayed around the editing tool UI, but this is merely an embodiment. The preview UI may be displayed in a designated position. The preview UI may also move within a screen through a drag touch input.

In addition, if a touch input is sensed on one of the plurality of preview pages, the processor 140 may control the display 110 to revise a content included in the preview page, on which the touch input is sensed, according to the touch input. Here, a revision of a content may include at least one selected from an insertion of a new content, and a change and a deletion of an existing content.

In particular, if a touch input is sensed on a first preview page corresponding to the first page which is currently displayed, the processor 140 may control the display 110 to simultaneously revise a content included in the first preview page and a content included in the first page according to the touch input.

Also, if a touch input is sensed on a second preview page corresponding to a second page, which is not currently displayed, among the plurality of pages, the processor 140 may control the display 110 to revise a content included in the second preview page according to the touch input and store the second page including the modified content in the memory 130. In addition, if a touch input for changing the first page to the second page while the first page is displayed, the processor 140 may control the display 110 to display the second page including the revised content.

The processor 140 may perform various types of operations according to a user touch input into the preview UI. According to an embodiment, the processor 140 may control the display 110 to zoom in the first page if a pinch-out touch is sensed on the first preview page corresponding to the first page while the first page is displayed and zoom out the first page if a pinch-in touch is sensed on the first preview page. According to another embodiment, if a touch input for touching and dragging a point of the preview UI for a preset time, the processor 140 may control the display 110 to drag the preview UI according to a direction of the dragging.

Also, the processor 140 may control the display 110 to display the editing tool UI together around the preview UI. Here, if a touch input is sensed on one of the plurality of preview pages after one of icons included in the editing tool UI is selected, the processor 140 may control the display 110 to revise a content included in the preview page, on which the touch input is sensed, according to an editing function corresponding to the selected icon.

Also, if a touch input for revising a content displayed on the first page is sensed, the processor 140 may control the display 110 to simultaneously revise a content displayed on the first page and a content displayed on the first preview page which is included in the preview UI and corresponds to the first page.

The processor 140 may control the display apparatus 100 according to user commands input through a plurality of users. In detail, if a touch input is sensed on one of the plurality of preview pages, and simultaneously another touch input is sensed on the first page, the processor 140 may control the display 110 to revise contents of the first page and the first preview corresponding to the first page according to the another touch input while revising a content included in the preview page, on which the touch input is sensed, according to the touch input.

Figure 3:
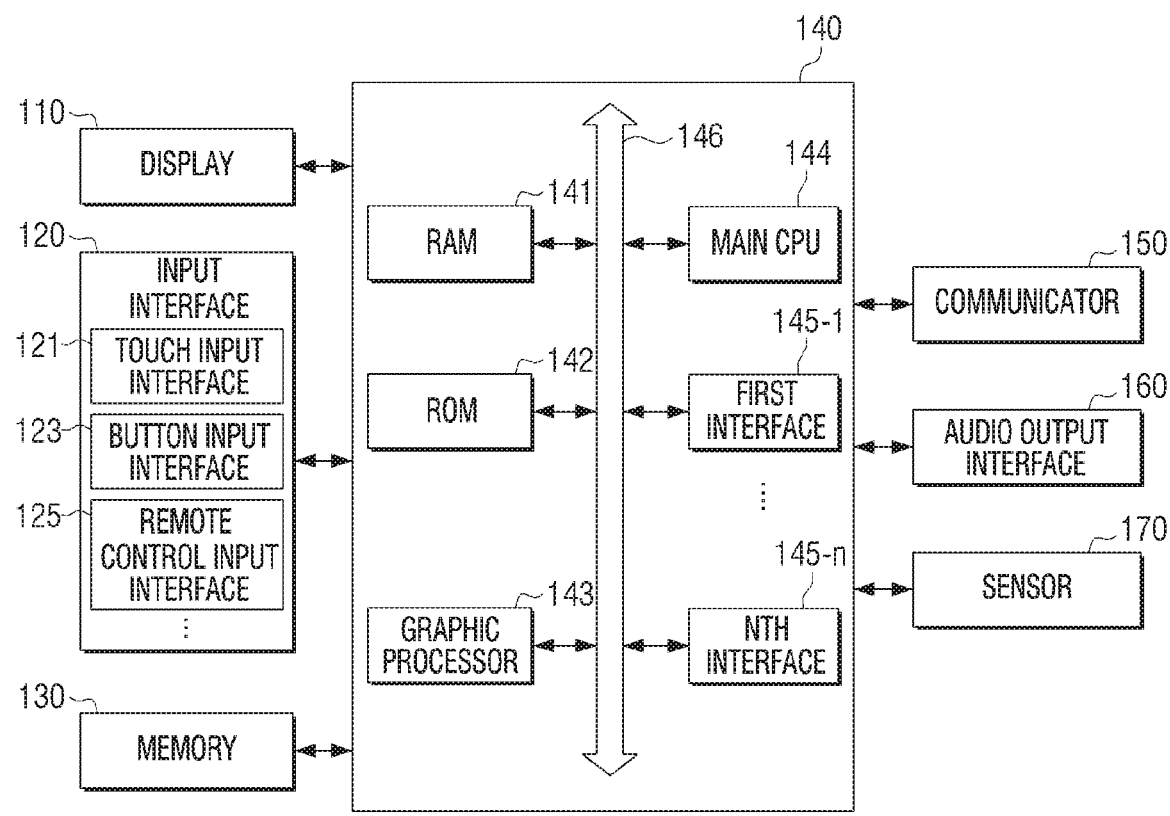
FIG. 3 is a block diagram of a detailed configuration of a display apparatus according to an embodiment.

FIG. 3 is a block diagram of a detailed configuration of a display apparatus according to an embodiment. As shown in FIG. 3, the display apparatus 100 may include the display 110, the input interface 120, the memory 130, a communicator 150, an audio output unit 160, a sensor 170, and the processor 140. Elements shown in FIG. 3 are exemplary for embodying embodiments of the disclosure, and hardware and/or software elements which are appropriately obvious to those skilled in the art may be further included in the display apparatus 100.

The display 110 displays various types of image data. In particular, the display 110 may display at least one of a plurality of pages. The display 110 may include a preview UI including a plurality of preview images corresponding to the plurality of images on at least one page. Here, the plurality of preview pages included in the preview UI may respectively include contents included in corresponding pages.

In particular, the display 110 may have a size larger than or equal to a preset size (e.g., 75 inches). For example, the display 110 may have a size such as 75 inches, 86 inches, 98 inches, or the like, but this is merely an embodiment. The display 110 may have a different size.

Also, the display 110 may be realized as a touch screen having a layer structure by being combined with a touch input interface 121 (e.g., a touch panel). The touch screen may have a display function, a function of detecting a touch input position, a touched area, and a touch input pressure, and a function of detecting a real-touch and a proximity touch.

The input interface 120 receives inputs of various types of user commands for controlling the display apparatus 100. In particular, as shown in FIG. 3, the input interface 120 may include various types of input units such as the touch input interface 121, a button input interface 123, a remote control input interface 125, and the like.

Here, the touch input interface 121 may sense a user touch. The touch input interface 121 may include a touch panel and a pen sensor. The touch panel may, for example, use at least one selected from a capacitive method, a decompressive method, an infrared method, and an ultrasonic method. The touch panel may further include a control circuit. The touch panel may further include a tactile layer and thus provide a user with a tactile reaction. The (digital) pen sensor may be a part of the touch panel or may include an additional recognition sheet. In particular, the touch input interface 121 included in an electronic blackboard may recognize a user of the digital pen. In detail, a frequency may be allocated to each digital pen, and the touch input interface 121 may recognize a user of a digital pen by recognizing the allocated frequency. The touch input interface 121 may also provide a multi-touch function of simultaneously sensing a plurality of touches which are input by a plurality of users.

The button input interface 123 may be included at an edge of the display apparatus 100 and may include a physical button, an optical key, or a keypad. The remote control input interface 125 is an element for receiving a control signal from a remote controller for controlling the display apparatus 100.

The memory 130 may store various types of programs and data necessary for an operation of the display apparatus 100. The memory 130 may be realized as a nonvolatile memory, a volatile memory, a flash memory, a hard disk drive (HDD), a solid state drive (SSD), or the like. The memory 130 may be accessed by the processor 140, and reading/recording/revising/deleting/updating of data may be performed with respect to the memory 130 by the processor 140. The term "memory" used herein may include the memory 130, a Read Only Memory (ROM) 142 or a Random Access Memory (RAM) 141 of the processor 140, or a memory card (e.g., a micro Secure Digital (SD) card, a memory stick, or the like) installed in the display apparatus 100.

Also, the memory 130 may store data on the plurality of pages.

The communicator 150 may perform communication with an external apparatus. In particular, the communicator 150 may receive a content from the external apparatus. Here, the processor 140 may insert the content received from the external apparatus into a page according to a user command.

The communicator 150 may include a Radio Frequency (RF) communication module, a Bluetooth (BT) communication module, and a Wireless Fidelity (WiFi) communication module, each of which may be realized as a connectivity chip, a communication circuitry, a communication interface, or the like. The RF communication module may receive one RF signal among various types of Radio Frequency Identification (RFID) frequency bands such as 135 kHz, 13.56 MHz, 433 MHz, 860-960 MHz, 2.45 GHz, and the like. In particular, the RF communication module includes a plurality of antennas for receiving an RF signal that the external apparatus broadcasts. Here, if a plurality of signal processors for processing signals that the plurality of antennas receive are included, the plurality of signal processors may simultaneously process RF signals which are broadcast from an Internet of Things (IoT) device. However, if one signal processor for processing signals that the plurality of antennas receive is included, the signal processor may process RF signals which are broadcast from the external apparatus through a switching operation. The BT communication module and the WiFi communication module may transmit and receive various types of connection information such as a Subsystem Identification (SSID), a session key, and the like by using a BT chip or a WiFi chip, connect communications by using the various types of connection information, and transmit and receive various types of information. The communicator 150 may perform communication with the external apparatus through various types of communication modules such as a Zigbee communication module, a Near Field Communication (NFC) communication module, and the like.

The audio output unit 160 may output audio data or a warning sound included in the content in an audible sound form through a speaker. Alternatively, the audio output unit 160 may output audio data to an external speaker through an audio output terminal.

The sensor 170 may sense a user. Here, the sensor 170 may sense the user by being realized as a camera or a proximity sensor, but this is merely an embodiment. The user may be sensed by another type of sensor.

The processor 140 (or a controller) may control an overall operation of the display apparatus 100 by using the various types of programs stored in the memory 130.

The processor 140 may include the RAM 141, the ROM 142, a graphic processor 143, a main Central Processing Unit (CPU) 144, a first through $n^{th}$ interfaces 145-1 through 145-n, and a bus 146. Here, the RAM 141, the ROM 142, the graphic processor 143, the main CPU 144, the first through $n^{th}$ interfaces 145-1 through 145-n, and the like may be connected to one another through the bus 146.

Figure 4:
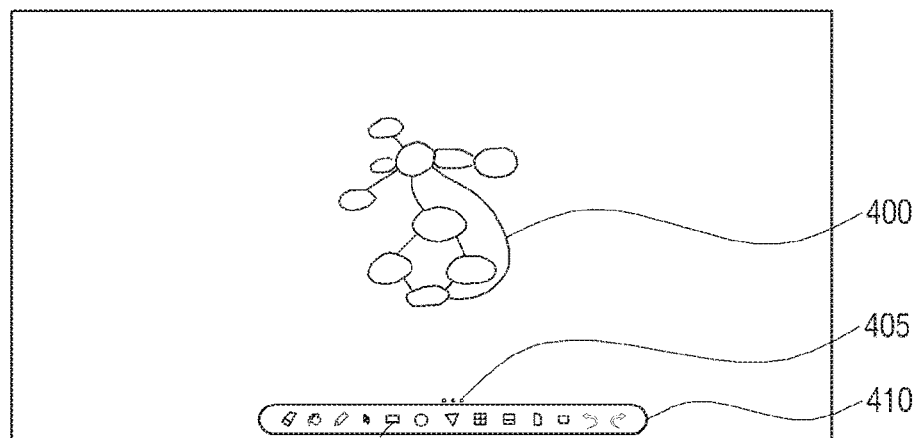
FIG. 4 is a view illustrating a method of generating a preview UI according to an embodiment.
Figure 4:
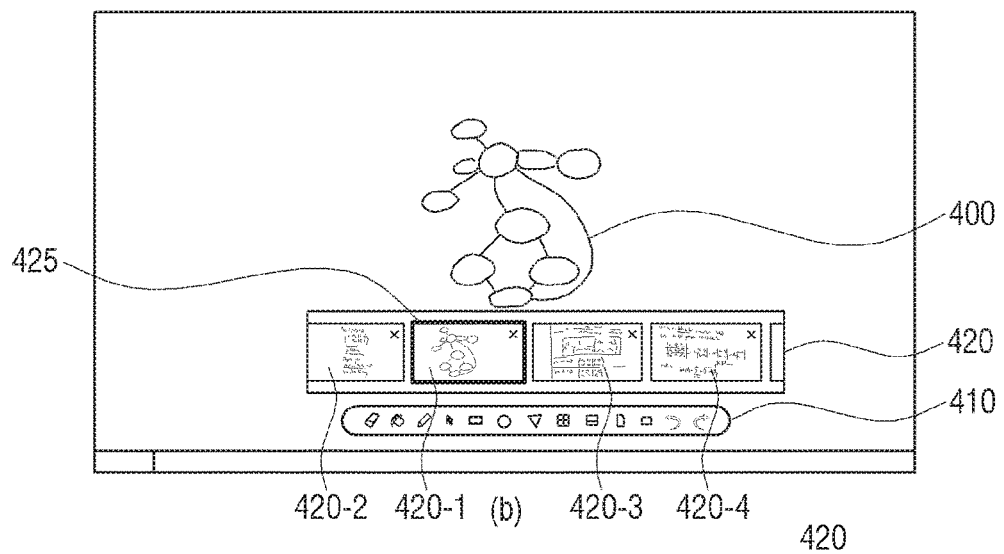
Figure 4:
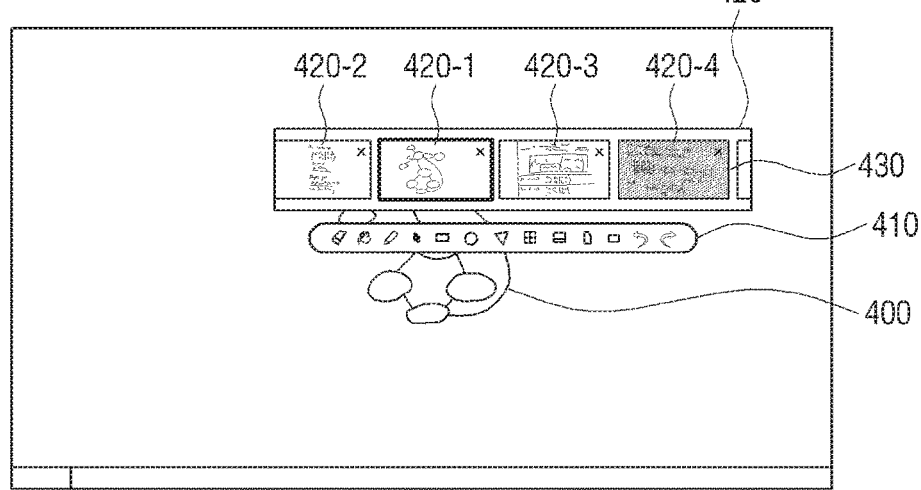

In particular, as shown in (a) of FIG. 4, the processor 140 may control the display 110 to display a first page of a plurality of pages. Here, the first page may include a writing content 400. Also, the processor 140 may control the display 110 to display an indicator 405 that indicates in which part the first page is positioned among the plurality of pages and an editing tool UI 410 including a plurality of icons together with the first page. Here, the editing tool UI 410 may include icons for editing functions, such as an eraser icon, a font color change icon, a font change icon, a font thickness change icon, a background color fill icon, and the like, and an icon 415 for generating a preview UI.

Here, if the icon 415 for generating the preview UI is selected from the icons included in the editing tool UI 410, the processor 140 may control the display 110 to display a preview UI 420, which includes a plurality of preview pages 420-1 through 420-4 corresponding to a plurality of pages, above the editing tool UI 410 as shown in (b) of FIG. 4. Here, as shown in (b) of FIG. 4, an indicator 425 for indicating a current page may be displayed on the first preview page 420-1 corresponding to the current page among the plurality of preview pages 420-1 through 420-4 included in the preview UI 420.

Here, the processor 140 may control the display 110 to generate a first graphic layer including the writing content 400 of the first page, generate a second graphic layer including the editing tool UI 410 and the preview UI 420, and overlay the first graphic layer with the second graphic layer.

In the above-described embodiment, the preview UI 420 has been described as being generated according to a touch input for selecting the icon 415 included in the editing tool UI 410, but this is merely an embodiment. The preview UI 420 may be generated according to another touch input. For example, if a touch input for selecting a preset button included in the display apparatus 100, a touch input for selecting a preset button included in a remote controller for controlling the display apparatus 100, a user touch having a preset pattern on the display 110, a user voice including preset words (e.g., "Generate Preview UI"), or the like is sensed, the processor 140 may control the display 110 to display the preview UI 420 on the display 110.

Also, as shown in (c) of FIG. 4, the preview UI 420 is movable within the display 110 according to a user touch. In detail, if a user touch for performing dragging to a particular point is sensed after touching the preview UI 420, the processor 140 may control the display 110 to move the preview UI 420 as shown in (c) of FIG. 4.

Also, the processor 140 may sense a user based on the sensor 170 and move the preview UI 420 according to a position of the sensed user. For example, if the user is sensed as being positioned on a left side of the display apparatus 100 through the sensor 170, the processor 140 may control the display 110 to display the preview UI 420 and the editing tool UI 410 in a left area of the display 110 according to a position of the user.

In addition, if a preset touch input (e.g., a double tap touch, a long press touch, or the like) is sensed for one preview page of the preview UI 420, the processor 140 may control the display 110 to change to a page corresponding to the preview page on which the preset touch input is sensed. For example, if a preset touch input is sensed for a fourth preview page corresponding to a fourth page while currently displaying a second page, the processor 140 may control the display 110 to change a current page from the second page to the fourth page and display the fourth page.

Also, the preview UI 420 may be arrayed based on a preview page corresponding to a currently displayed page. For example, if the currently displayed page is the second page, the processor 140 may control the display 110 to display a second preview page corresponding to the second page in a center and display a preview page around the second preview page based on the second preview page.

In addition, if one of a plurality of preview pages included in the preview UI 420 is selected, the processor 140 may control the display 110 to display the selected preview page differently from another preview page. For example, as shown in (c) of FIG. 4, the processor 140 may control the display 110 to highlight 430 a fourth preview page 420-4 selected by a user. According to another embodiment, the processor 140 may control the display 110 to display a selected preview page in different color and contrast from other preview pages or display another indicator.

Also, if a user touch is sensed on a preview page corresponding to a currently displayed page among a plurality of preview pages included in the preview UI 420, the processor 140 may control the display 110 to revise a content included in the preview page on which the user touch is currently sensed and a content included in the currently displayed page according to the user touch.

Figure 5:
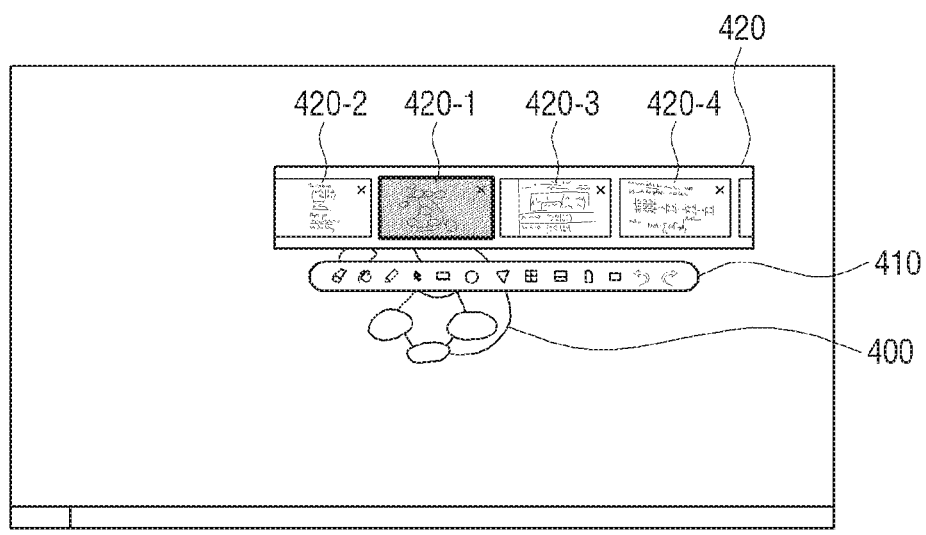
FIGS. 5 and 6 are views illustrating a method of modifying contents by using a preview UI according to an embodiment.
Figure 5:
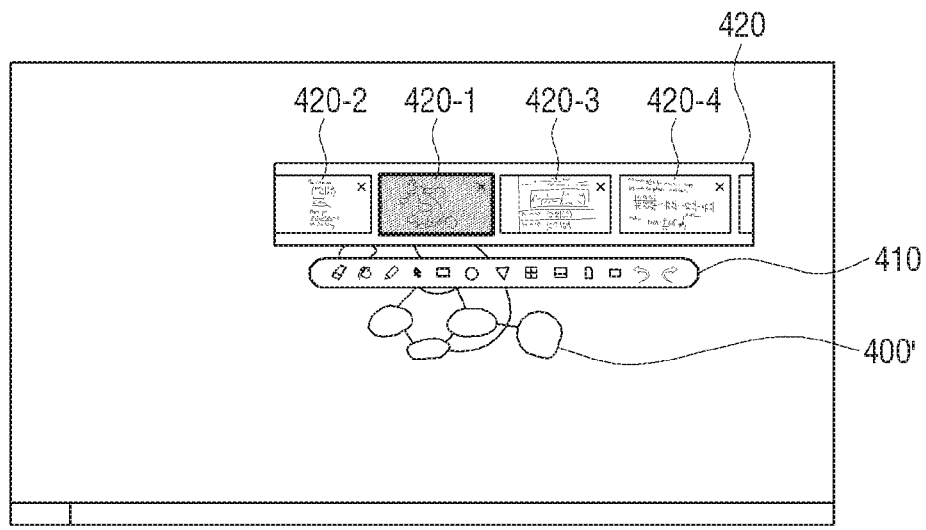

In detail, if a user touch for adding new writing onto the first preview page 420-1 corresponding to the currently displayed page among the plurality of preview pages 420-1 through 420-4 is sensed as shown in (a) of FIG. 5, the processor 140 may control the display 110 to add the new writing onto the first preview page 420-1 and display a writing content 400', to which the new writing is added, on the currently displayed page as shown in (b) of FIG. 5. In other words, although a user does not input a user touch onto the currently displayed page, the user may revise a content displayed on a current page through a preview page. In particular, a display apparatus having a large screen display may further increase convenience of a user by revising a content included in a page through a small preview page not through the large screen display.

In the above-described embodiment, a user touch for adding new writing has been described as being immediately input into the first preview page 420-1, but this is merely an embodiment. If a preset touch input (e.g., a long press touch input, a multi-touch input, or the like) for selecting the first preview page 420-1 is input before adding new writing, the first preview page 420-1 may be highlighted, and a touch input for adding the new writing onto the first preview page 420-1 which is highlighted may be input.

Also, if a user touch is sensed on a preview page corresponding to a page, which is not currently displayed, among the plurality of preview pages included in the preview UI 420, the processor 140 may revise a content included in the preview page according to the user touch, also revise a content included in a page corresponding to the preview page on which the user touch is sensed, and store the revised contents. In addition, if a touch input for changing to the page including the revised content is sensed, the processor 140 may control the display 110 to display the page storing the revised content.

Figure 6:
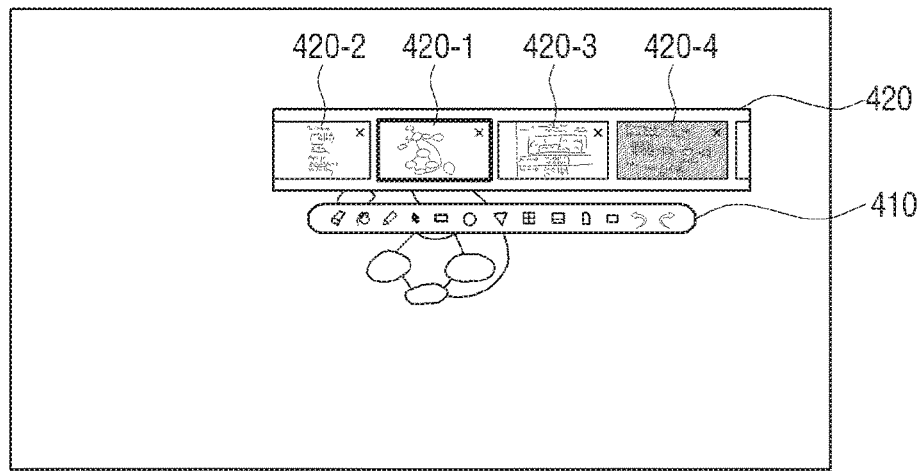
Figure 6:
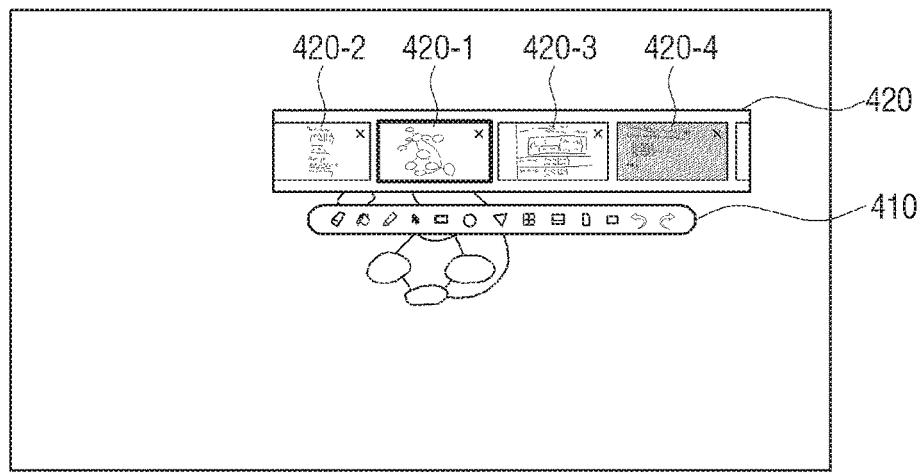
Figure 6:
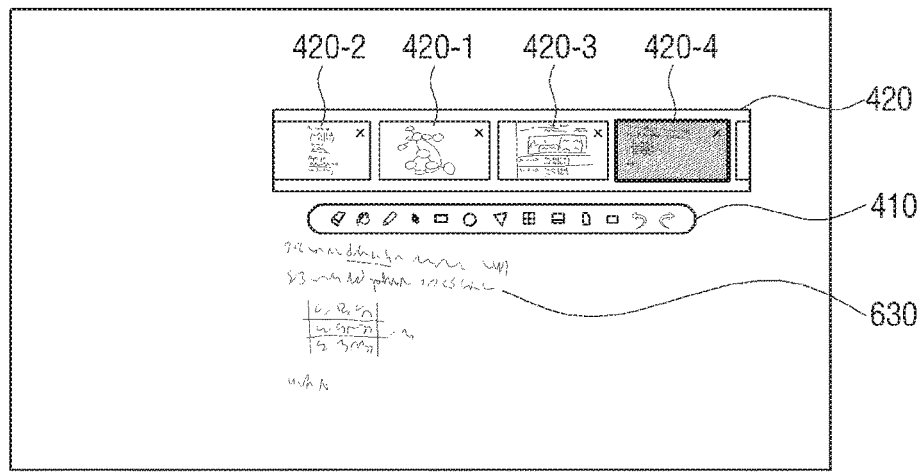

In detail, if a user touch for deleting a part of a content included in the fourth preview page 420-4 corresponding to a page, which is not currently displayed, among the plurality of preview pages 420-1 through 420-4 is sensed while the second page is displayed as shown in (a) of FIG. 6, the processor 140 may delete the part of the content included in the fourth preview page 420-4 according to the user touch, also delete a part of a content included in a fourth page, and store the contents from which the parts are deleted as shown in (b) of FIG. 6. Also, if a user command for changing to the fourth page is input, the processor 140 may control the display 110 to display the fourth page including a content 630 from which a part is deleted, as shown in (c) of FIG. 6.

In other words, a content of a page which is not currently displayed may be revised by revising the content through a preview page without moving the page, thereby increasing convenience of a user.

Also, if a pinch-in or pinch-out touch is sensed on a preview page corresponding to a page which is currently displayed, the processor 140 may zoom in or zoom out the currently displayed page according to the pinch-in or pinch-out touch.

Figure 7A:
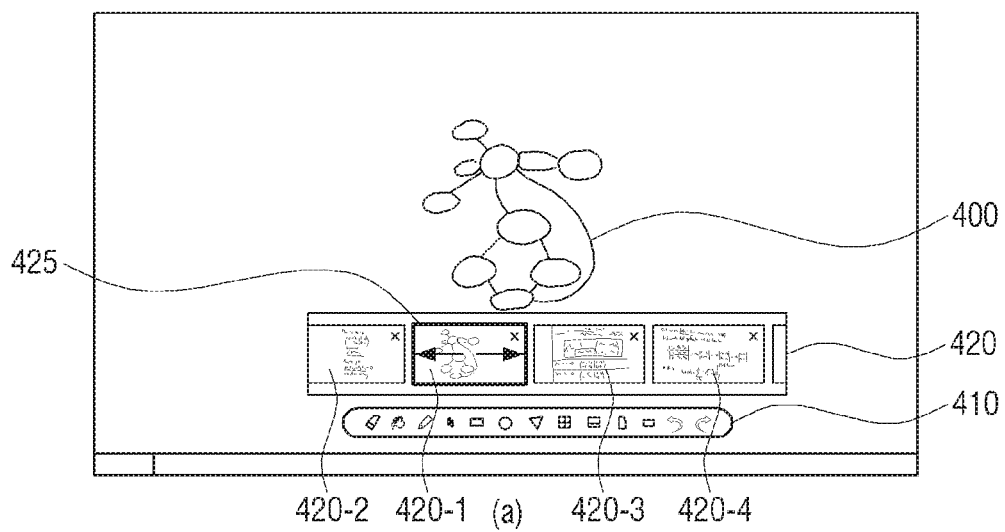
FIGS. 7A and 7B are views illustrating a method of zooming in or zooming out a page by using a preview UI according to an embodiment.
Figure 7A:
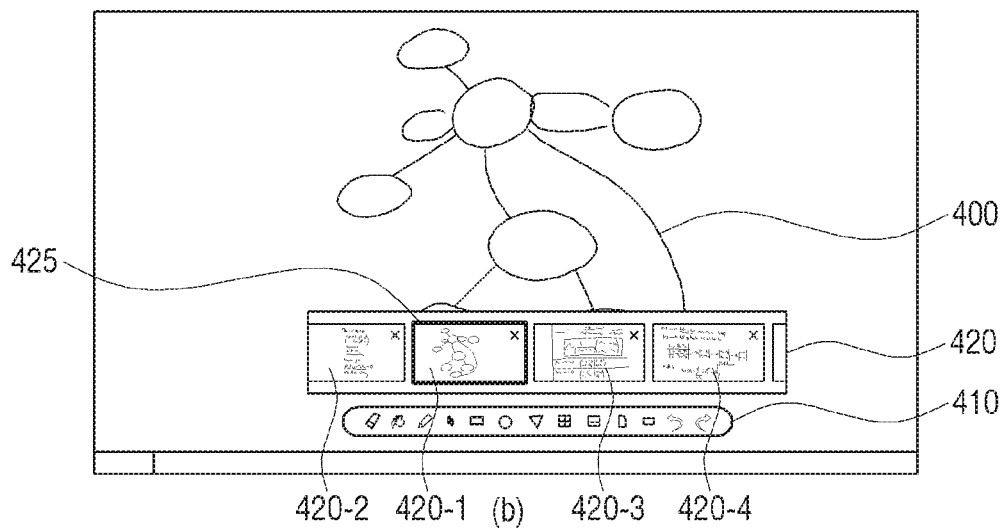
Figure 7B:
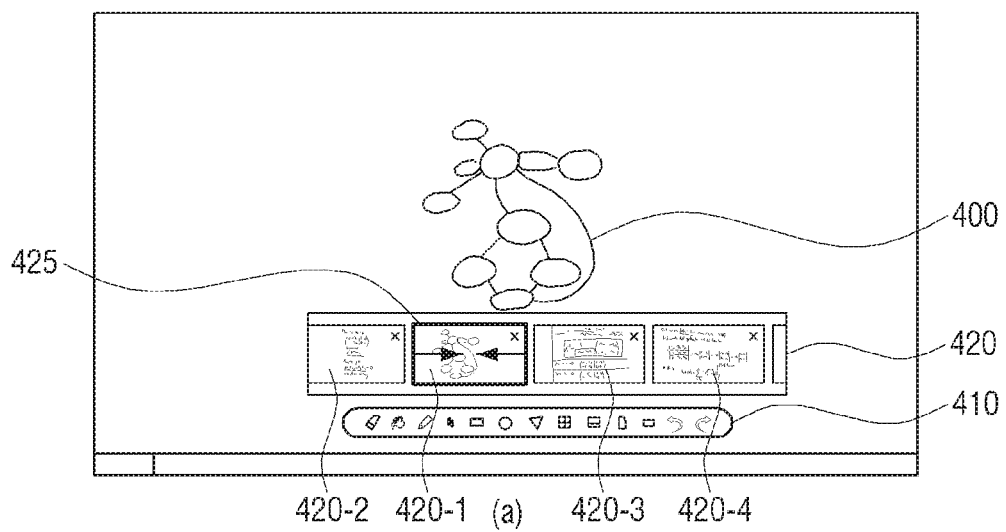
Figure 7B:
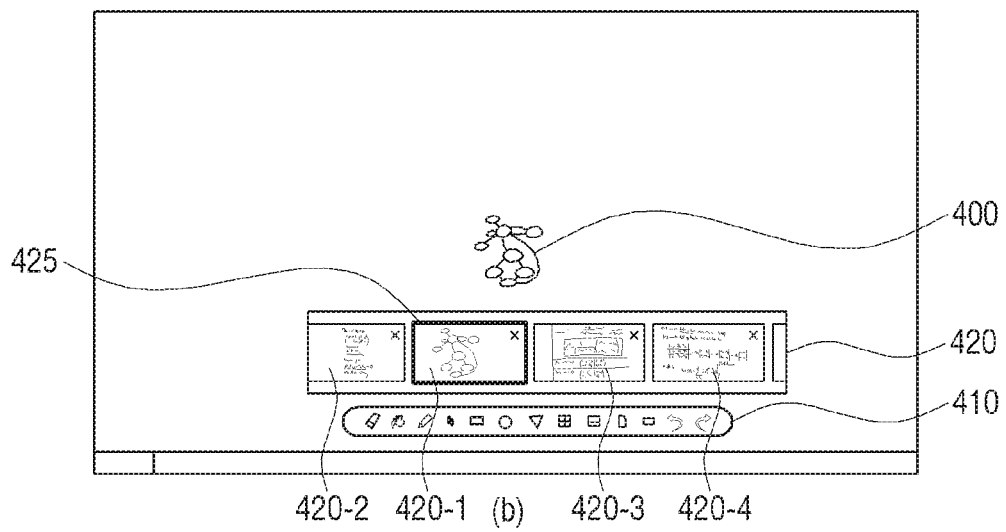

In detail, if a pinch-out touch is sensed on the first preview page 420-1 corresponding to a currently displayed page as shown in (a) of FIG. 7A, the processor 140 may control the display 110 to enlarge and display a content by zooming in the currently displayed page according to the pinch-out touch as shown in (b) of FIG. 7A. Here, the first preview page 420-1 may also be zoomed in. Also, if a pinch-in touch is sensed on the first preview page 420-1 corresponding to a currently displayed page as shown in (a) of FIG. 7B, the processor 140 may control the display 110 to reduce and display a content by zooming out the currently displayed page according to the pinch-in touch as shown in (b) of FIG. 7B. Here, the first preview page 420-1 may also be zoomed out.

Also, if the editing tool UI 410 is included around a preview UI, and a touch input is sensed on one of a plurality of preview pages after one of icons included in the editing tool UI 410 is selected, the processor 140 may revise a content included in the preview page, on which the touch input is sensed, according to an editing function corresponding to the selected icon.

Figure 8:
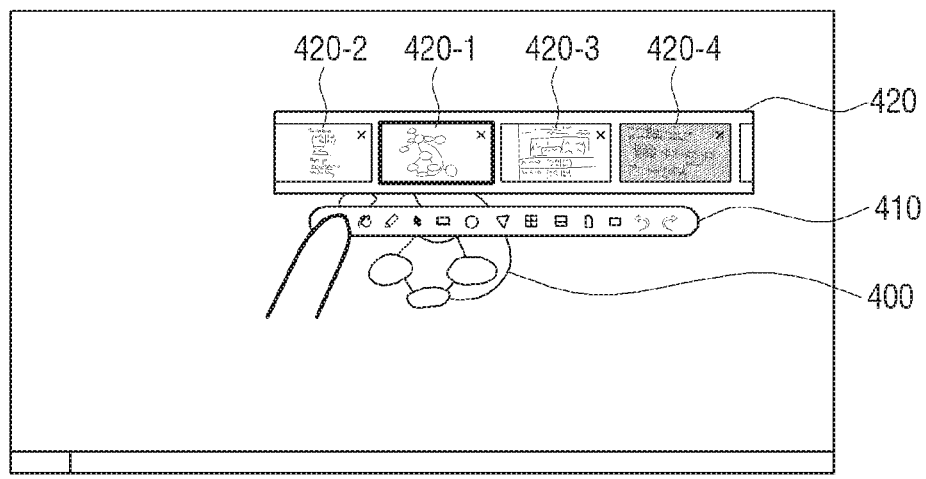
FIG. 8 is a view illustrating a method of modifying contents included in a preview page by using an editing tool UI according to an embodiment.
Figure 8:
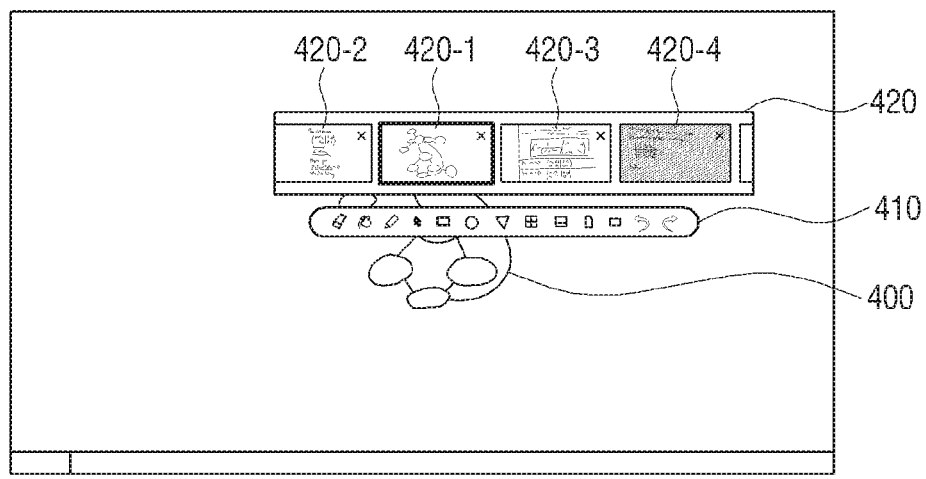

For example, as shown in (a) of FIG. 8, the editing tool UI 410 may be displayed under the preview UI 420. If a user touch is sensed on a content included in the fourth preview page 420-4 after the eraser icon is selected from the editing tool UI 410, the processor 140 may execute a deleting function corresponding to the eraser icon and control the display 110 to delete a part of the content included in the fourth preview page 420-4 and display the content from which the part is deleted according to the user touch as shown in (b) of FIG. 8. Selecting the eraser icon as described above is merely an embodiment, and thus various types of icons such as the font color change icon, the background color fill icon, the font thickness control icon, and the like may be selected besides the eraser icon.

Also, the preview UI 420 may display merely a few of a plurality of preview pages. For example, if a plurality of preview pages are eight, the processor 140 may control the display 110 to display merely four of the plurality of preview pages. Here, the processor 140 may navigate a preview page, which is not currently displayed, among the plurality of preview pages according to a drag touch which is input into the preview UI 420.

Figure 9:
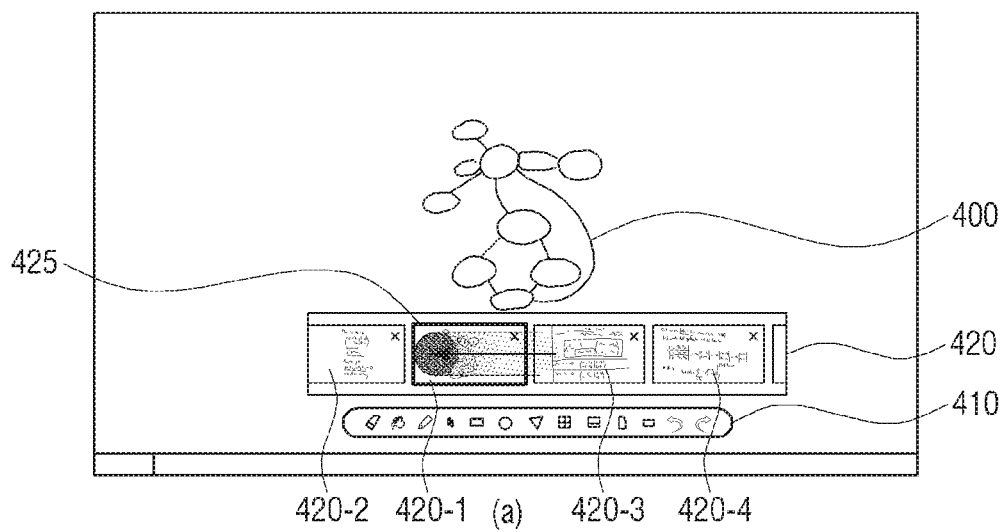
FIG. 9 is a view illustrating a method of navigating a preview UI according to an embodiment.
Figure 9:
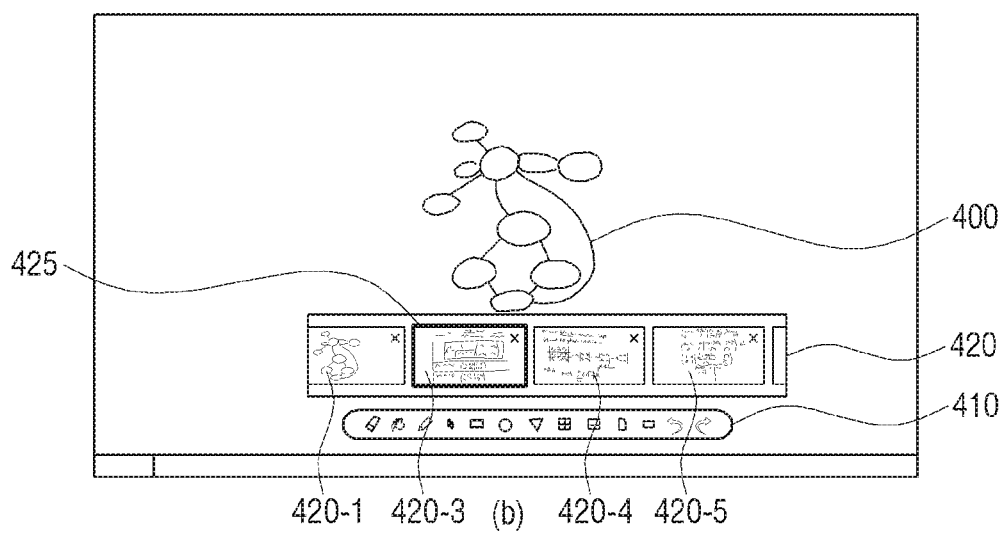

In detail, as shown in (a) of FIG. 9, the processor 140 may control the display 110 to display the preview UI 420 including the first through fourth preview pages 420-1 through 420-4. Also, if a user touch for touching an area of the preview UI 420 and then dragging the area to the left is sensed, the processor 140 may control the display 110 to move the preview UI 420 to the right and then display the preview UI 420 including the first preview page 420-1 and third through fifth preview pages 420-3 through 420-5 as shown in (b) of FIG. 9.

In addition, if a multi-touch where a user touch is sensed at a plurality of points is sensed through the input interface 120, the processor 140 may revise a content included in at least one of a page and a preview page included in a preview UI according to the multi-touch.

Figure 10:
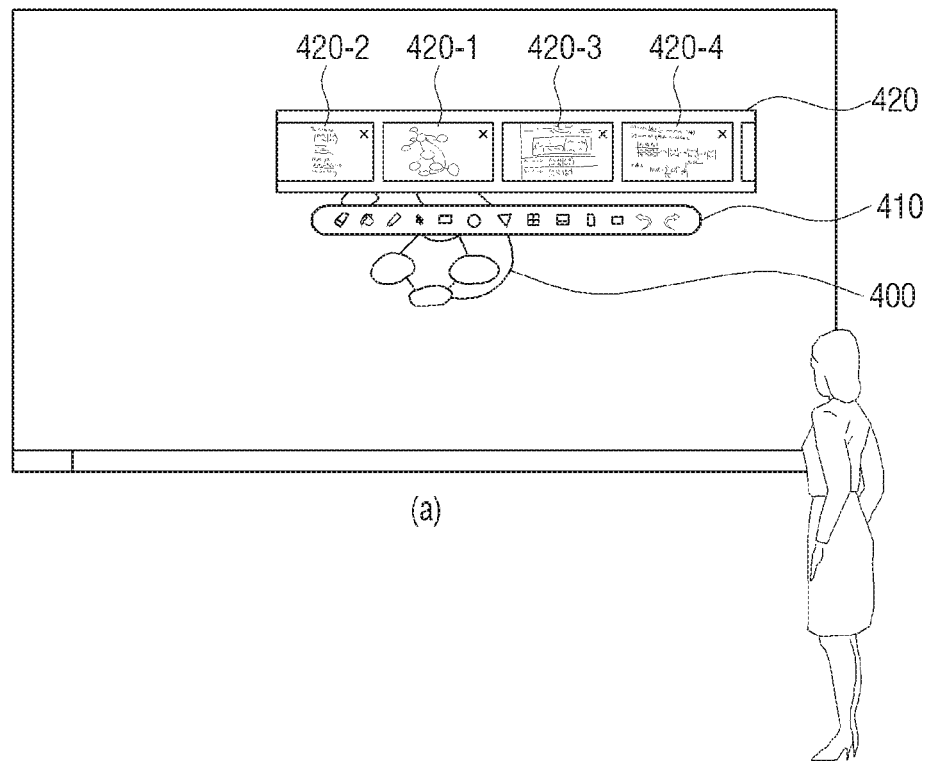
FIG. 10 is a view illustrating using a display apparatus by a plurality of users according to an embodiment.
Figure 10:
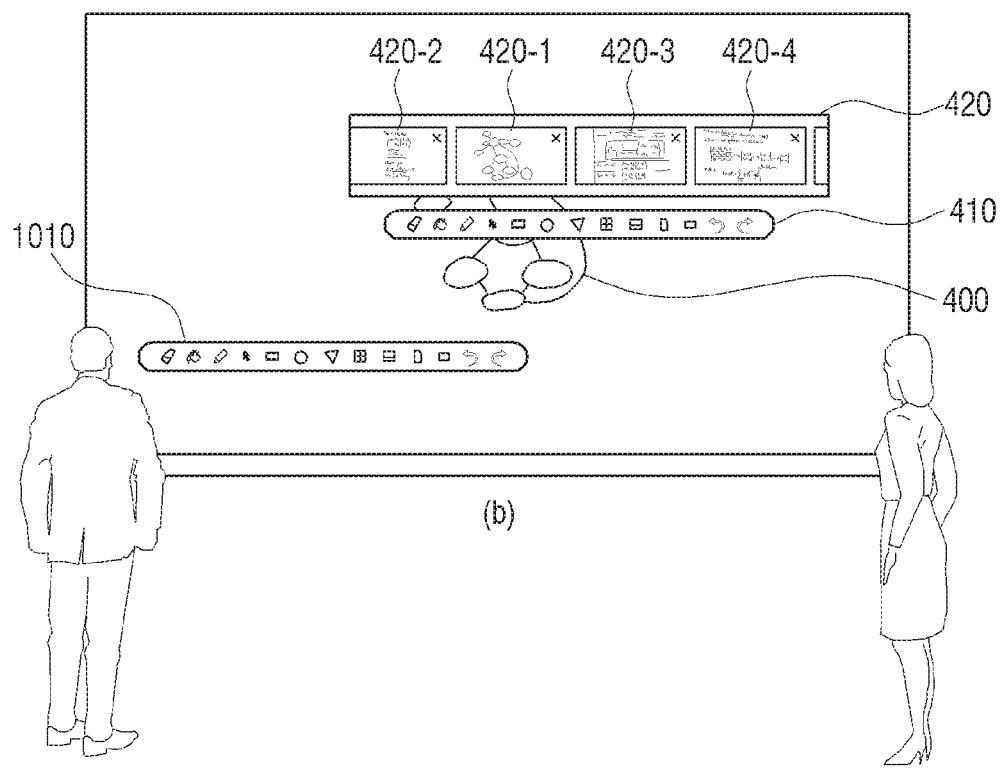

In detail, the processor 140 may control the display 110 to display the preview UI 420 and the editing tool UI 410 in an area corresponding to a position of a first user as shown in (a) of FIG. 10. Here, if a second user is sensed, the processor 140 may control the display 110 to display another editing tool UI 1010 in an area corresponding to a position where the second user is sensed. Here, the another editing tool UI 1010 may be immediately displayed according to sensing of the second user, but this is merely an embodiment. If a preset touch (e.g., a long press touch, a touch having a preset pattern, or the like) of the second user is sensed on the display 110, the another editing tool UI 1010 may be displayed. Here, if a touch input is sensed on the fourth preview page 420-4 of a plurality of preview pages by the first user, and simultaneously another touch input is sensed on a first page by the second user, the processor 140 may control the display 110 to revise a content of the first page according to the touch input of the second user while revising a content included in the fourth preview page 420-4 according to the touch input of the first user and revise a content of the first preview page 420-1 corresponding to the first page. Here, the second user may also display another preview UI by selecting an icon included in the another editing tool UI 1010.

Through a multi-touch operation as described above, a plurality of users may more efficiently control a large screen display.

Figure 11:
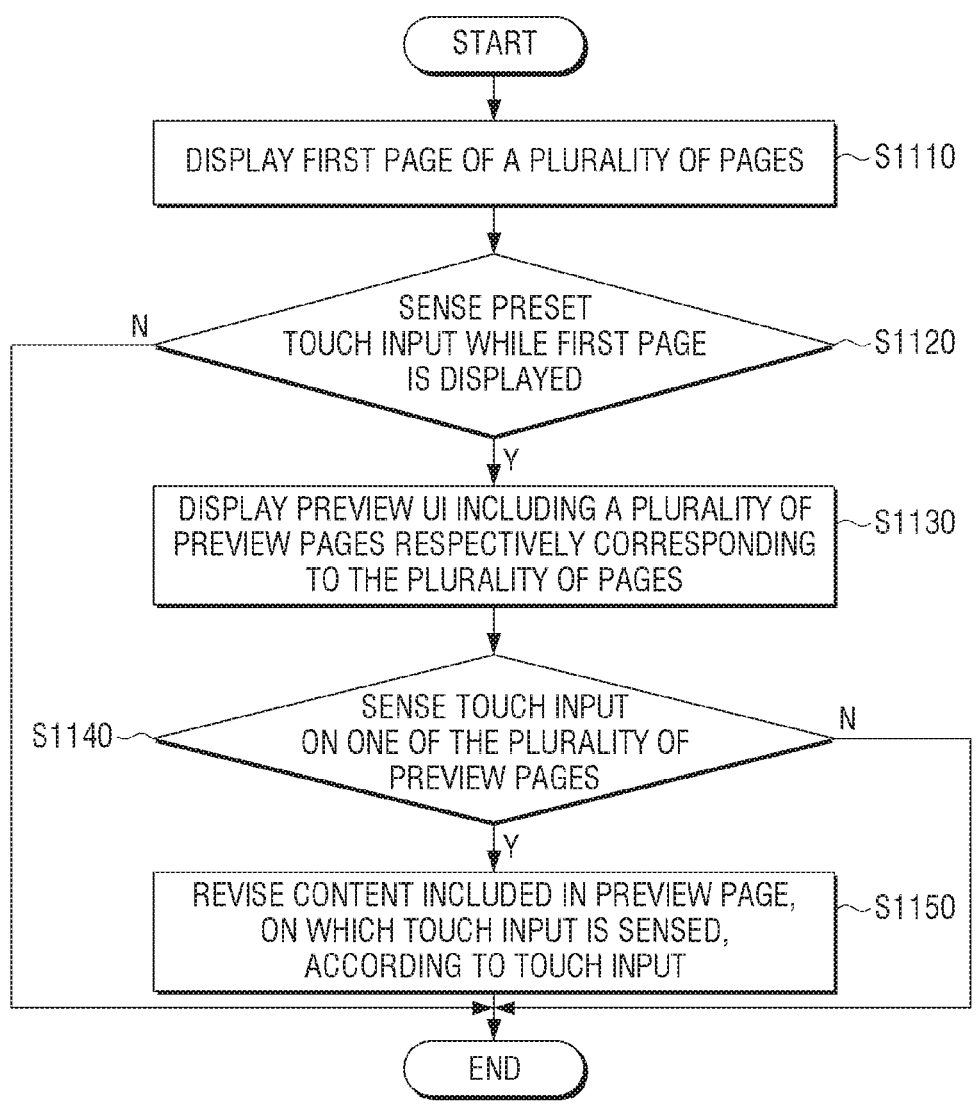
FIG. 11 is a flowchart of a method of controlling a display apparatus according to an embodiment.

FIG. 11 is a flowchart of a method of controlling a display apparatus according to an embodiment of the disclosure.

In operation S1110, the display apparatus 100 displays a first page of a plurality of pages. Here, the plurality of pages may respectively include contents (e.g., a writing content, a moving picture content, an image content, and the like).

In operation S1120, the display apparatus 100 determines whether a preset touch input is sensed while the first page is displayed. Here, the preset touch input may be a touch input for selecting a preset icon included in an editing tool UI displayed on the first page but is not limited thereto.

If the preset touch input is sensed in operation S1120, the display apparatus 100 displays a preview UI including a plurality of preview pages respectively corresponding to the plurality of pages in operation S1130. Here, the preview UI may display merely a few of the plurality of preview pages and may be scrolled and navigated according to a user touch. Also, the preview UI is movable within the display 110 according to a user touch and may be displayed in an area corresponding to a user position.

In operation S1140, the display apparatus 100 determines whether a touch input is sensed on one of the plurality of preview pages.

If the touch input is sensed on one of the plurality of preview pages in operation S1140, the display apparatus 100 revises a content included in the preview page, on which the touch input is sensed, according to the touch input in operation S1150. For example, if a touch input is sensed on a first preview page corresponding to a first page which is currently displayed, the display apparatus 100 may simultaneously revise a content included in the first preview page and a content included in the first page according to the touch input. According to another embodiment, if a touch input is sensed on a second preview page corresponding to a second page, which is not currently displayed, among a plurality of pages, the display apparatus 100 may revise a content included in the second preview page according to the touch input and store the second page including the revised content. Also, if a touch input for changing to the second page is sensed, the display apparatus 100 may display the second page including the revised content.

According to various embodiments of the disclosure as described above, a user may navigate a page, which is not currently displayed, or revise a content of the page more conveniently and intuitively through a preview UI. Therefore, a large screen display may be increasingly conveniently used in a display apparatus.

Various embodiments of the disclosure may be embodied as software including instructions stored in machine-readable storage media (e.g., computer-readable storage media). A device may an apparatus that calls an instruction from a storage medium, may operate according to the called instruction, and may include an electronic device (e.g., an electronic device A) according to disclosed embodiments. If the instruction is executed by a processor, the processor may directly perform a function corresponding to the instruction or the function may be performed by using other types of elements under control of the processor. The instruction may include codes generated or executed by a compiler or an interpreter. The machine-readable storage medium may be provided as a non-transitory storage medium type. Here, "non-transitory" means that a storage medium does not include a signal and is tangible but does not distinguish semi-permanent and temporary storages of data in the storage medium.

Also, according to an embodiment of the disclosure, a method according to the various embodiments of the disclosure may be included and provided in a computer program product. The computer program product may be transacted as a product between a seller and a buyer. The computer program product may be distributed as a type of a machine-readable storage medium (e.g., a type of a compact disc read only memory (CD-ROM)) or may be distributed online through an application store (e.g., Play Store™). If the computer program product is distributed online, at least a part of the computer program product may be at least temporally or temporarily generated in a storage medium such as a memory of a server of a manufacturer, a server of an application store, or a relay server.

Each of elements according to the various embodiments (e.g., modules or programs) may include a single entity or a plurality of entities, and some of corresponding sub elements described above may be omitted or other types of sub elements may be further included in the various embodiments. Alternatively or additionally, some elements (e.g., modules or programs) may be integrated into one entity and then may equally or similarly perform a function performed by each of corresponding elements that are not integrated. Operations performed by modules, programs, or other types of elements according to the various embodiments may be sequentially, in parallel, repeatedly, or heuristically executed or at least some operations may be executed in different sequences or may be omitted, or other types of operations may be added.

What is claimed is:

1. A method of controlling a display apparatus, the method comprising:
    displaying a first page of a plurality of pages;
    based on a first touch input being sensed while the first page is displayed, displaying the first page and a preview user interface comprising a plurality of preview pages respectively corresponding to the plurality of pages including the first page, wherein each of the plurality of preview pages is smaller than the first page; and
    based on a second touch input being sensed on a first preview page corresponding to the first page among the plurality of preview pages while the first page and the plurality of preview pages are displayed, revising a content of the first page corresponding to the first preview page on which the second touch input is sensed by inserting writing content into the first page, according to the second touch input.

2. The method of claim 1, wherein the revising comprises, based on the second touch input being sensed on the first preview page corresponding to the first page while the first page and the plurality of preview pages are displayed, simultaneously revising a content of the first preview page and the content of the first page according to the second touch input.

3. The method of claim 1, wherein the revising comprises:
    based on the second touch input being sensed on a second preview page corresponding to a second page among the plurality of pages, revising a content of the second preview page according to the second touch input, wherein the second page is not displayed when the second touch input is sensed on the second preview page; and
    storing the second page comprising the revised content of the second preview page.

4. The method of claim 3, further comprising:
    based on a third touch input for changing to the second page being sensed, displaying the second page comprising the revised content of the second preview page.

5. The method of claim 1, further comprising:
    based on the second touch input being a pinch-out touch being sensed on the first preview page among the plurality of preview pages, zooming in the first page; and
    based on the second touch input being a pinch-in touch being sensed on the first preview page, zooming out the first page.

6. The method of claim 1, wherein the displaying of the preview user interface comprises displaying an editing tool user interface near the preview user interface,
    wherein the revising comprises, based on the second touch input being sensed on the first preview page among the plurality of preview pages after an icon in the editing tool user interface is selected, revising a content of the first preview page on which the second touch input is sensed, according to an editing function corresponding to the selected icon.

7. The method of claim 1, further comprising:
    based on a third touch input for revising a content displayed on the first page, being sensed, revising the content displayed on the first page and simultaneously revising a content displayed on the first preview page corresponding to the first page.

8. The method of claim 1, further comprising:
    based on a third touch input for touching and dragging a point of the preview user interface for a preset time, being sensed, dragging the preview user interface according to a direction of the dragging.

9. The method of claim 1, wherein the displaying of the preview user interface comprises, based on the first touch input for selecting an icon for generating the preview user interface from an editing tool UI displayed on the first page, being sensed, displaying the preview user interface.

10. The method of claim 1, wherein the revising comprises, based on the second touch input being sensed on the first preview page among the plurality of preview pages simultaneously with a third touch input being sensed on the first page, revising the content of the first page and a content of the first preview page corresponding to the first page according to the third touch input, while revising the content of the first preview page on which the second touch input is sensed, according to the second touch input.

11. A display apparatus comprising:
    a display;
    a touch input interface configured to sense a touch input; and
    a processor configured to:
        control the display to display a first pages;
        based on a first touch input being sensed through the touch input interface while the first page is displayed, control the display to display the first page and a preview user interface comprising a plurality of preview pages respectively corresponding to the plurality of pages including the first page, wherein each of the plurality of preview pages is smaller than the first page; and
        based on a second touch input being sensed on a first preview page corresponding to the first page among the plurality of preview pages through the touch input interface while the first page and the plurality of preview pages are displayed, control the display to revise a content of the first page corresponding to the first preview page on which the second touch input is sensed by inserting writing content into the first page, according to the second touch input.

12. The display apparatus of claim 11, wherein the processor is further configured to, based on the second touch input being sensed on the first preview page corresponding to the first page while the first page and the plurality of preview pages are displayed, control the display to simultaneously revise a content of the first preview page and a content of the first page according to the second touch input.

13. The display apparatus of claim 11, further comprising a memory,
    wherein the processor is further configured to:
        based on the second touch input being sensed on a second preview page corresponding to a second page among the plurality of pages, control the display to revise a content of the second preview page according to the second touch input, wherein the second page is not displayed when the second touch input is sensed on the second preview page; and
        store the second page comprising the revised content of the second preview page in the memory.

14. The display apparatus of claim 13, wherein the processor is further configured to, based on a third touch input for changing to the second page, being sensed through the touch input interface, control the display to display the second page comprising the revised content of the second preview page.

15. The display apparatus of claim 11, wherein the processor is further configured to control the display to zoom in the first page based on a pinch-out touch being sensed on the first preview page, among the plurality of preview pages, and zoom out the first page based on a pinch-in touch being sensed on the first preview page.

16. The display apparatus of claim 11, wherein an editing tool user interface is displayed near the preview user interface, and wherein the processor is further configured to, based on the second touch input being sensed on the first preview page among the plurality of preview pages after an icon in the editing tool user interface is selected, control the display to revise a content of the first preview page on which the second touch input is sensed, according to an editing function corresponding to the selected icon.

17. The display apparatus of claim 11, wherein the processor is further configured to, based on a third touch input for revising a content displayed on the first page, being sensed through the touch input interface, control the display to simultaneously revise the content displayed on the first page and a content displayed on the first preview page corresponding to the first page.

18. The display apparatus of claim 11, wherein the processor is further configured to, based on a third touch input for touching and dragging a point of the preview user interface for a preset time, being sensed through the touch input interface, control the display to drag the preview user interface according to a direction of the dragging.

19. The display apparatus of claim 11, wherein the processor is further configured to, based on a third touch input for selecting an icon for generating the preview user interface from an editing tool user interface displayed on the first page, being sensed through the touch input interface, control the display to display the preview user interface.

20. The display apparatus of claim 11, wherein the processor is further configured to, based on the second touch input being sensed on the first preview page among the plurality of preview pages simultaneously with a third touch input being sensed on the first page, control the display to revise the content of the first page and a content of the first preview page corresponding to the first page according to the third touch input, while revising the content of the first preview page on which the touch input is sensed, according to the second touch input.

* * * * *